2 Sheets—Sheet 1.
C. YOUNG.
Machine for Making Carriage-Axles.
No. 8,705. Reissued May 6, 1879.
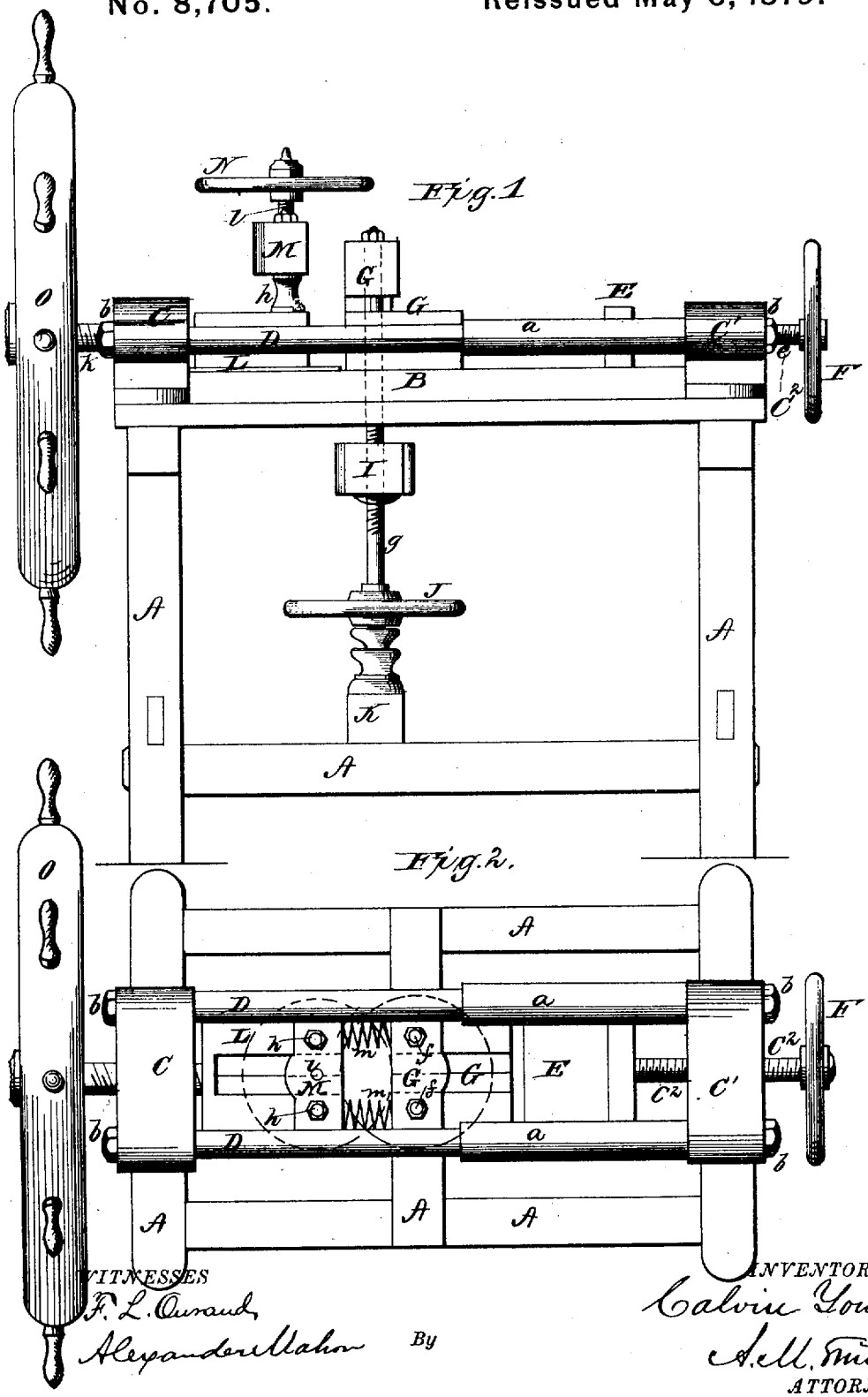
WITNESSES
F. L. Ourand
Alexander Mahon
By
INVENTOR
Calvin Young
A. M. Smith
ATTORNEY

C. YOUNG.

Machine for Making Carriage-Axles.

No. 8,705. Reissued May 6, 1879.

WITNESSES
F. L. Durand
Alexander Mahon

By

INVENTOR
Calvin Young
A. M. Smith
ATTORNEY

UNITED STATES PATENT OFFICE.

CALVIN YOUNG, OF AUBURN, NEW YORK.

IMPROVEMENT IN MACHINES FOR MAKING CARRIAGE-AXLES.

Specification forming part of Letters Patent No. 54,639, dated May 8, 1866; Reissue No. 8,705, dated May 6, 1879; application filed March 4, 1879.

*To all whom it may concern:*

Be it known that I, CALVIN YOUNG, of Auburn, county of Cayuga, State of New York, have invented certain new and useful Improvements in the Manufacture of Axles, of which the following is a full, clear, and exact description, reference being had to the accompanying drawings, making part of this specification, in which—

Figure 3:
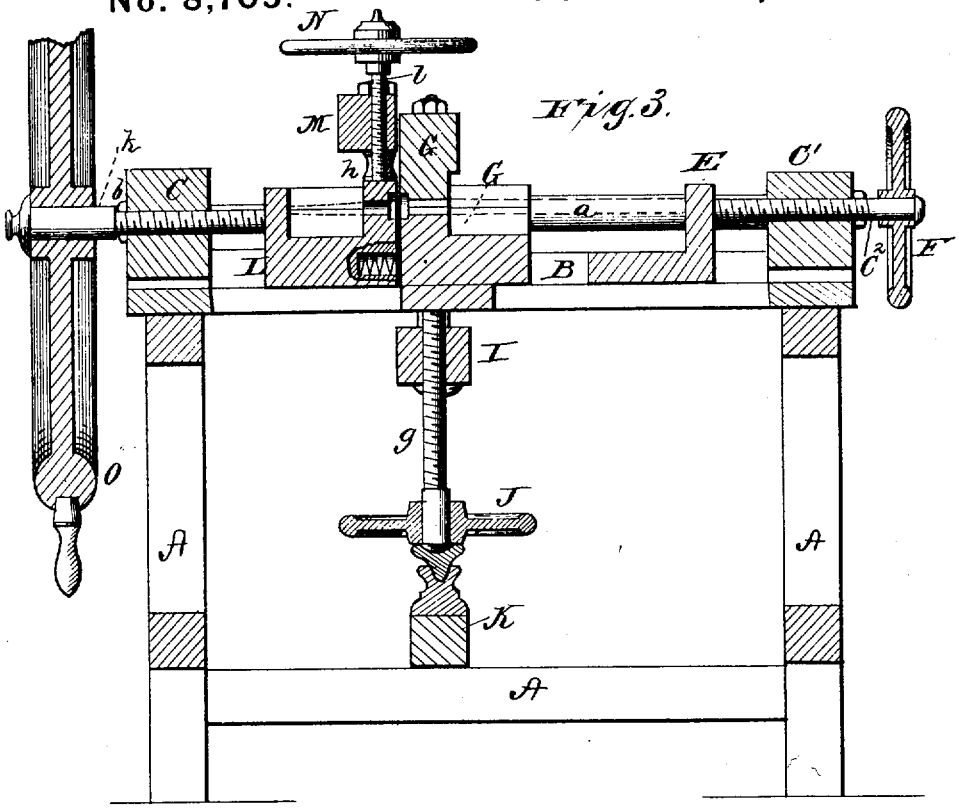
Figure 4:
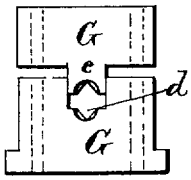

Figure 1 represents a side elevation of the machine for forming a solid collar or shoulder on the axle. Fig. 2 represents a top plan of the same. Fig. 3 is a longitudinal vertical section through the machine, and Fig. 4 represents one of the sets or pairs of dies on an enlarged scale.

Similar letters of reference denote corresponding parts in all the figures.

The invention consists in forming a solid collar or shoulder upon a carriage or other axle, or on the bar or blank of which the axle is to be made, by means of two divided dies, one movable and the other fixed, which grasp the axle-blank at points intermediate between its ends, with the portion of metal to be upset, or upon which the collar is to be formed, between them, where it is left free to expand to form the collar or shoulder through end pressure exerted upon the blank.

It further consists in the employment, in combination with two divided dies, one movable and the other stationary, of a set-screw for adjusting the axle-blank to and holding it in the proper relation to the dies.

It further consists in the combination, with two divided dies, which support the axle-blank, and between which the collar is formed, of means for giving end pressure to the blank and endwise movement to one of the divided dies, for a purpose hereinafter explained.

In the accompanying drawings, A represents a substantial upright frame, upon which is secured an iron bed, B. At the ends of this bed are two head-blocks, C $C^1$, held together by long through-bolts D, having collars *a* and nuts *b* upon them, for adapting them to sustain the strain exerted upon them in applying end pressure to the axle.

A gage, E, arranged at one end of the bed, is made adjustable by means of a screw, $C^2$, passing through the head-block $C^1$, and operated by a hand-wheel, F, for properly placing the blank so that the collar or shoulder shall be formed thereon at the desired point in its length, and for sustaining the end-thrust of the axle in the process of forming the collar.

G is a divided block or die, made stationary on the bed, the part *d* thereof adjacent to the bed being formed upon or otherwise permanently secured to the bed-plate.

The other part, *e*, of the die is attached to a cross-head connected, by through-bolts *f*, with a nut-block, I, which is made adjustable by means of a screw, *g*, and hand-wheel J, the screw resting upon or stepped in a pillow-block, K, and passing through the nut-block I, its upper end abutting against the bed-plate B.

By rotating the screw *g* by means of the hand-wheel J, the nut-block I is moved up or down, and with it the cross-head and die *e*, thus facilitating the placing of the axle-blank in and its removal from the die-block, and the grasping and holding of the same when placed therein.

L is a second divided die-block or carriage, adapted to move on suitable ways on the bed-plate B. It has also an upper and an under half-die, as in the case of die-block G, except that the die of one, L, may be made round, to grasp the round part or arm of the axle, while the other (see Fig. 4) is made angular to conform to the shape of the blank or the shank portion thereof.

A nut-block, M, is connected with the movable die-block L by upright pillow-bolts *h*, and a screw, *i*, passes through the block M in such manner that its point shall press upon the upper adjustable half of the die. A hand-wheel, N, serves to operate the screw, and with it the upper half of the die, for causing it to clamp or to release the blank. The movable die-block or carriage L has an endwise movement on its ways on the bed-plate B imparted to it by a screw, *k*, provided with a hand-wheel, O, for operating it, said screw working in a thread formed in the head-block C. Springs *m* may be placed between the stationary and movable die-blocks, for retracting or pushing the latter back when the screw *k* is run back.

The operation is as follows: An axle bar or blank is placed in the dies, which are separated, as shown in Fig. 2, one end being placed against the gage E, and the bar or blank is then adjusted by means of the screw $C^2$, to bring the part thereof on which the collar or shoulder is to be formed into proper position between the two die-blocks. The movable half of each die-block is screwed down upon the blank, causing both die-blocks to grasp and hold it at points intermediate between its ends, leaving the portion of the blank between the two die-blocks uncontrolled and free to expand or be swelled out and upset (the bar at that point having, of course, been previously brought to the required degree of heat for that purpose) by end pressure exerted through the screw *k*, acting upon the moving block or carriage L. The walls or adjacent vertical faces of the two die-blocks control the disposition of the metal in the line of the length of the bar or blank; but otherwise the metal is free to dispose of itself laterally between the die-blocks until near the end of the movement of the movable block, when the near approach of the adjacent faces of the two blocks forces the metal into the dies formed therein, and causes it to assume a compact and more finished form.

The advantages of a solid collar or shoulder on an axle over one welded on are very great, both in economy and increased strength; but the size of the bar or blank operated upon, the quantity of metal to be upset, and the difficulty of getting at the position on the blank where the collar is to be formed have heretofore prevented the formation of such solid collars upon axles. By my peculiar manner of manipulating the metal—first uncontrolled, and then, by suitable dies, brought into play at the required time and place—I have succeeded in forming such solid collars, thereby producing a very superior axle for carriages and other purposes.

I am aware that it is not new to upset metal into dies for giving it the required form, and I therefore do not claim such process broadly and irrespective of the manner described of upsetting the metal, and the particular thing produced by the process or manipulation described.

Having now described my invention, what I claim as new, and desire to secure by Letters Patent, is—

1. In combination with a suitable supporting bed or frame, the two divided collar forming and griping dies, which grasp the axle-bar at two points more or less remote from its ends, and mechanism to force said bar endwise in upon itself, so as to upset that portion of it which is unsupported between the two dies, and cause the latter to compress said upset portion, substantially as described.

2. In combination with the supporting bed or frame and the two divided collar forming and griping dies, designed to grasp and upset and to compress the upset part of the axle-bar, as described, the screw for adjusting the axle-bar endwise, and supporting it against endwise movement during the upsetting operation, substantially as described.

3. In combination with the supporting bed or frame and the two divided collar forming and griping dies, designed to grasp and upset and to compress the upset part of the axle-bar, as described, the screw $C^2$, to adjust the bar and support it against endwise movement during the upsetting operation, and the screw *k*, to force the bar in upon itself and cause it to upset in that part lying unsupported between the dies, substantially as set forth.

CALVIN YOUNG.

Witnesses:
C. W. UPHAM,
D. M. KIRBY.